(12) United States Patent
Stewart et al.

(10) Patent No.: US 9,220,652 B1
(45) Date of Patent: Dec. 29, 2015

(54) LAUNCHABLE BIODEGRADABLE VESSEL TO DELIVER CREMATED REMAINS OR DRY MATERIALS INTO A BODY OF WATER

(71) Applicants: Ian H Stewart, Lake Elsinore, CA (US); Samantha H Stewart, Lake Elsinore, CA (US); Meredith H Stewart, Lake Elsinore, CA (US); Alexander H Stewart, Menifee, CA (US)

(72) Inventors: Ian H Stewart, Lake Elsinore, CA (US); Samantha H Stewart, Lake Elsinore, CA (US); Meredith H Stewart, Lake Elsinore, CA (US); Alexander H Stewart, Menifee, CA (US)

(*) Notice: Subject to any disclaimer, the term of this patent is extended or adjusted under 35 U.S.C. 154(b) by 0 days.

(21) Appl. No.: 14/624,747

(22) Filed: Feb. 18, 2015

Related U.S. Application Data

(63) Continuation-in-part of application No. 14/336,851, filed on Jul. 21, 2014, now abandoned.

(51) Int. Cl.
*A61G 17/08* (2006.01)
*B65D 43/02* (2006.01)
*B65D 1/16* (2006.01)
*A61G 99/00* (2006.01)

(52) U.S. Cl.
CPC ............... *A61G 17/08* (2013.01); *A61G 99/00* (2013.01); *B65D 1/16* (2013.01); *B65D 43/02* (2013.01)

(58) Field of Classification Search
CPC ...... A61G 17/08; A61G 17/007; A61G 99/00; B63C 7/30; F41B 11/00; F41B 11/80; B65D 1/16; B65D 43/02
USPC ...................................... 27/1; 441/32; 124/56
See application file for complete search history.

(56) References Cited

U.S. PATENT DOCUMENTS

| | | | | |
|---|---|---|---|---|
| 3,732,602 | A * | 5/1973 | Vigh | 27/1 |
| 5,239,733 | A * | 8/1993 | Vail et al. | 27/1 |
| 5,393,253 | A * | 2/1995 | Humble et al. | 441/32 |
| 5,636,418 | A * | 6/1997 | Vail et al. | 27/1 |
| 5,774,958 | A * | 7/1998 | Casimir | 27/1 |
| 6,041,483 | A * | 3/2000 | Burch | 27/1 |
| D703,415 | S * | 4/2014 | Khan | D99/5 |
| 2003/0046798 | A1* | 3/2003 | Valles Camps et al. | 27/1 |
| 2006/0179623 | A1* | 8/2006 | Robinson | 27/1 |
| 2009/0013513 | A1* | 1/2009 | Laurens | 27/1 |
| 2014/0041169 | A1* | 2/2014 | Brown | 27/1 |

* cited by examiner

*Primary Examiner* — William Miller

(57) ABSTRACT

A launchable biodegradable vessel for delivery of cremated remains or other dry materials into a body of water. The vessel is a prolate spheroid of size and shape designed specifically for easy handling and delivery by hand, or by an air cannon or other launching device to achieve greater and/or safer distance. The vessel is made of a dissolvable plastic or plant-based material that will break down in fresh or salt water. The vessel may be designed for faster dispersion of cremated remains or other dry materials once it makes contact with the water, by the placement of holes in its shell.

1 Claim, 7 Drawing Sheets

Figure 1:
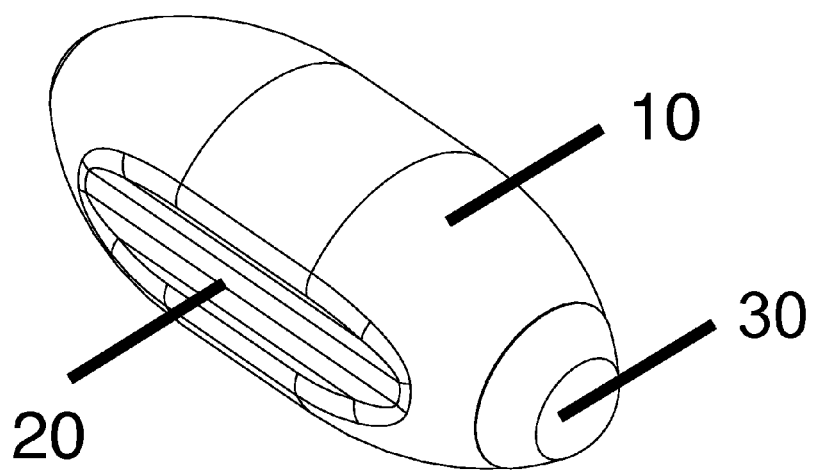

LAUNCHABLE BIODEGRADABLE VESSEL TO DELIVER CREMATED REMAINS OR DRY MATERIALS INTO A BODY OF WATER

BACKGROUND

The dispersion of dry materials into a body of water is used in a variety of fields. Those fields include, but are not limited to, disposition of cremated remains into an ocean or other natural body of water; distribution of dye, anti-algae or other treatments into a man-made body of water; and dissemination of food or fertilizer in aquaculture environments including fish farms and hydroponics.

In any, situation where dry materials are being introduced to a body of water, the user is at the mercy of the outside elements. Wind can cause dry material to either be blown back on the user, or away from its intended dispersion area. In the case of cremated remains, this adds a negative aspect to an already emotional experience for loved ones. In the case of dispersion of chemicals, wind adds a safety risk, given possible exposure of the skin and eyes to those materials. There is also possibility of waste of materials, if they are blown back onto land. In the event of rain, dry materials can become wet before introduction to the body of water, adding further difficulty to the dispersion.

SUMMARY

In accordance with one embodiment, the vessel may be filled with cremated remains or dry material that is to be delivered into a body of water. The launchable biodegradable vessel has a cavity for holding the materials to be dispersed and a cap capable of sealing the materials in the cavity, preventing loss of the materials until dissolution occurs. The prolate spheroid shape and indentations in the sides allow for easy grip of the vessel, and it can be thrown or launched a distance away from the user. Its size and shape, along with the placement of launching rings circling its sides, allow it to be launched by hand, by catapult, or by air cannon.

ADVANTAGES

Several advantages of one or more aspects can be seen. The vessel allows for the delivery of cremated remains or other dry materials to a body of water from a higher deck of a ship, since it can be thrown or launched away from the ship, rather than having to be dropped straight down. There is less risk of the container striking a lower deck, or other object, once it is released. The size and shape of the vessel also allow it to be placed inside an air cannon or similar device, so that it may be launched a greater distance away from the user. This differs from those previously known biodegradable vessels, in that its configuration allows for an easier and safer delivery of cremated remains or other dry materials over a greater distance.

The vessel includes a cap which seals the contents for cleaner handling of the materials during delivery. The cap may be securely affixed to the vessel by screw threads, glue, or a pin made of the same dissolvable material or other means. The vessel is made of a PVA plastic or other biodegradable material, which will dissolve when fully immersed in water. The dissolving container will not be harmful to any plants or animals living in the water, or any humans or animals coming into contact with the water.

DRAWINGS

Figures

Figure 2:
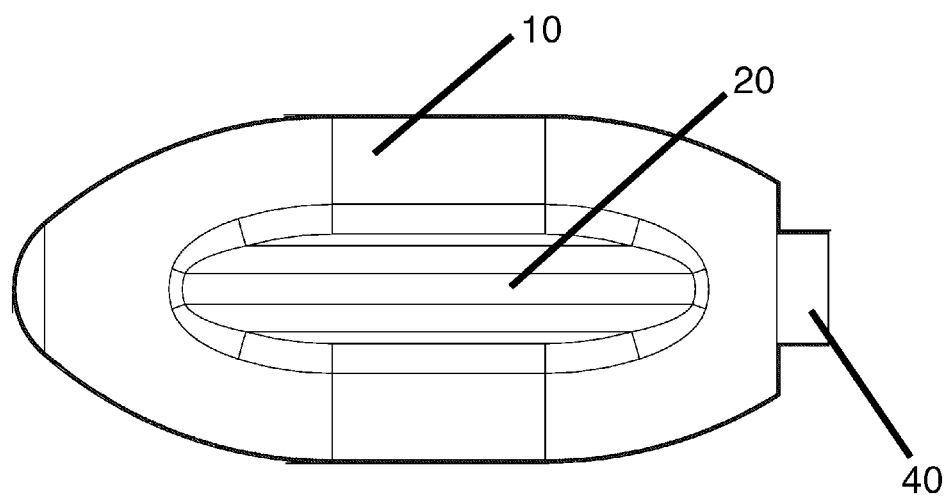
Figure 3:
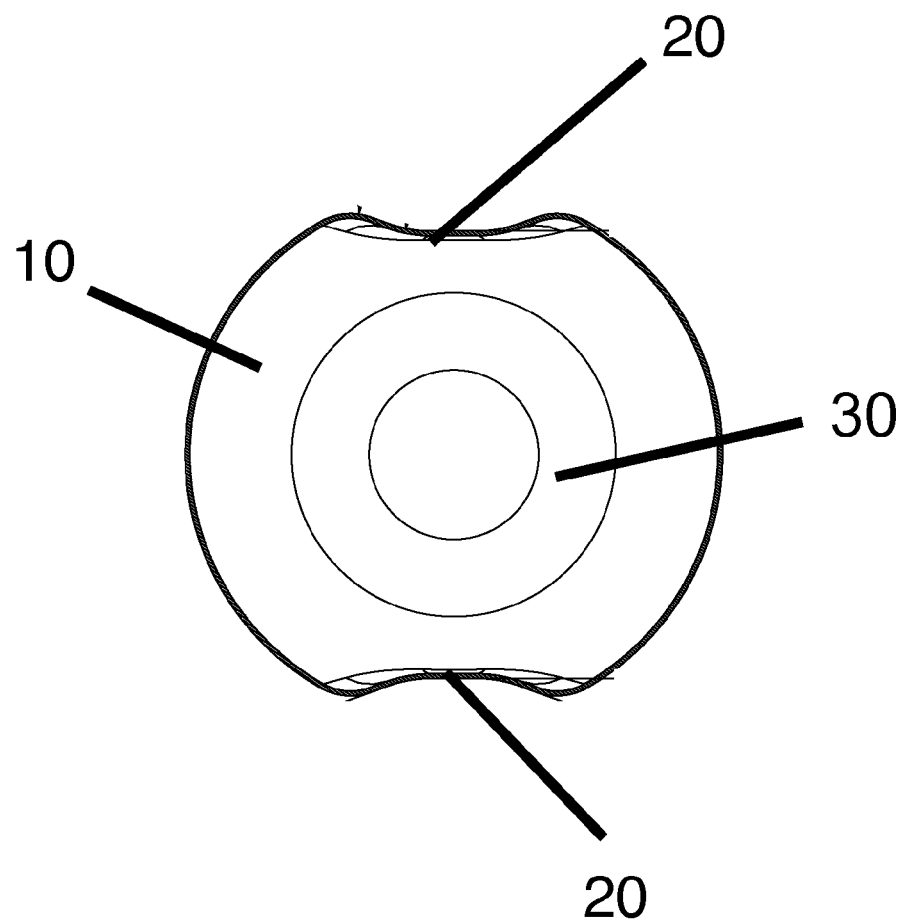
Figure 4:
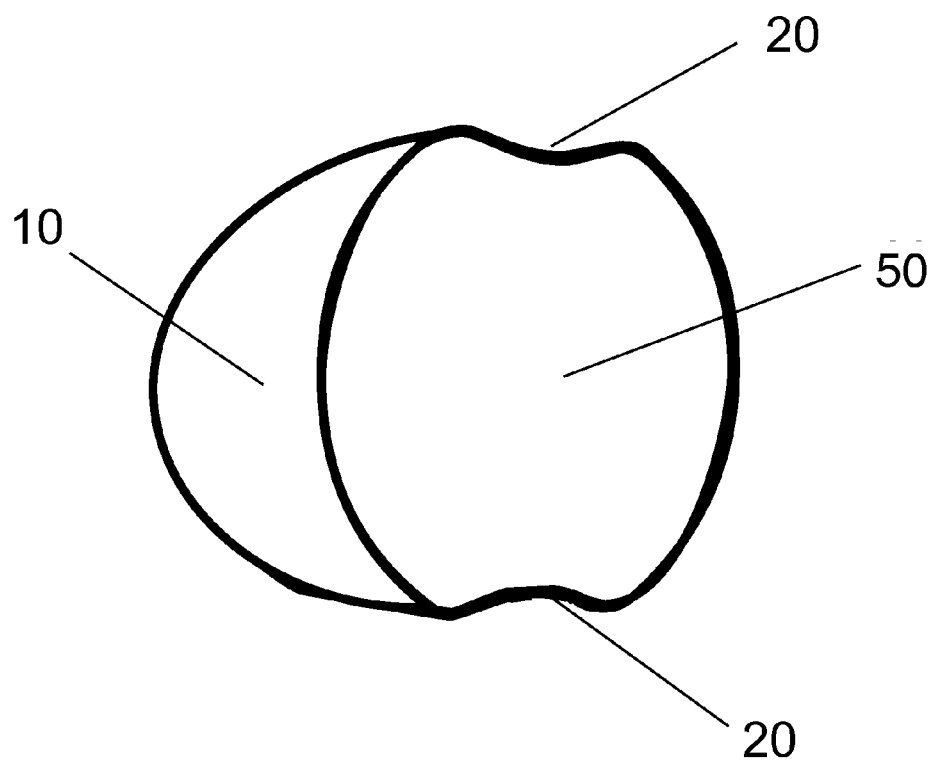
Figure 5:
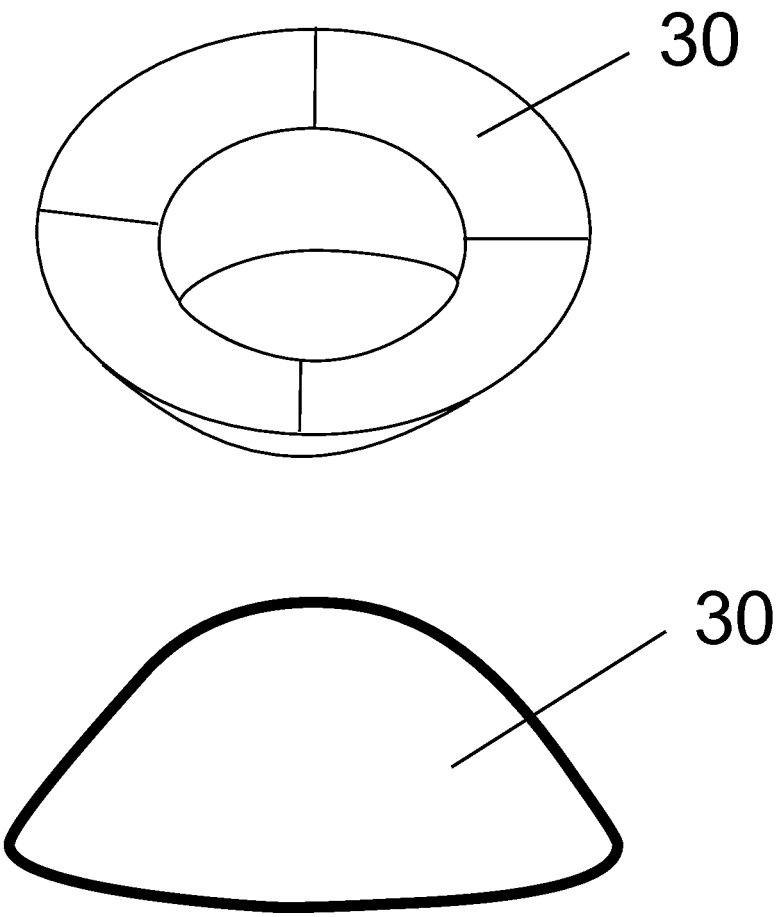
Figure 6:
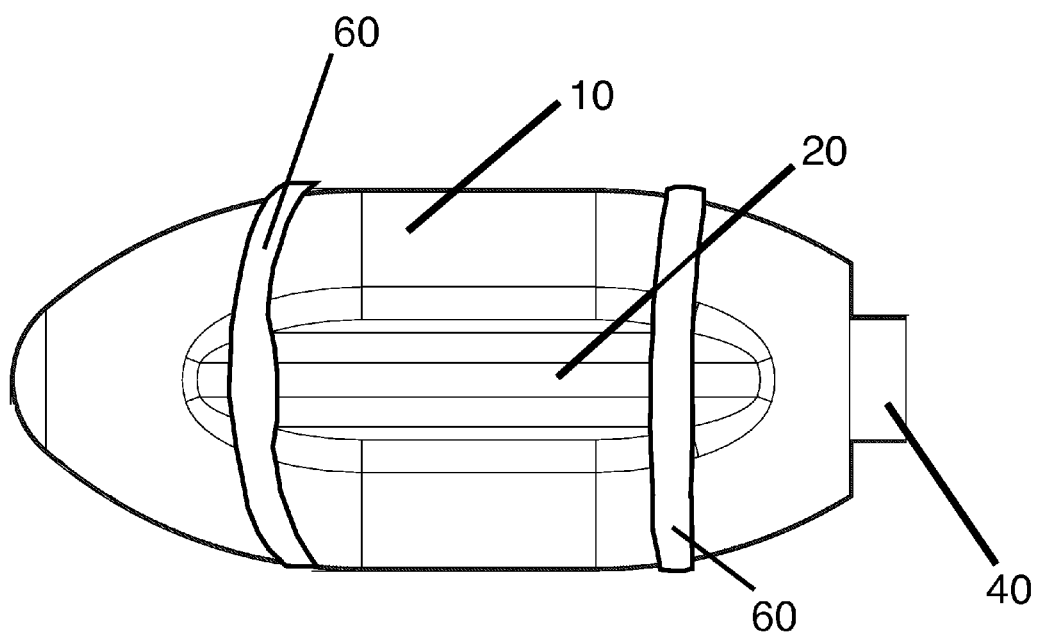
Figure 7:
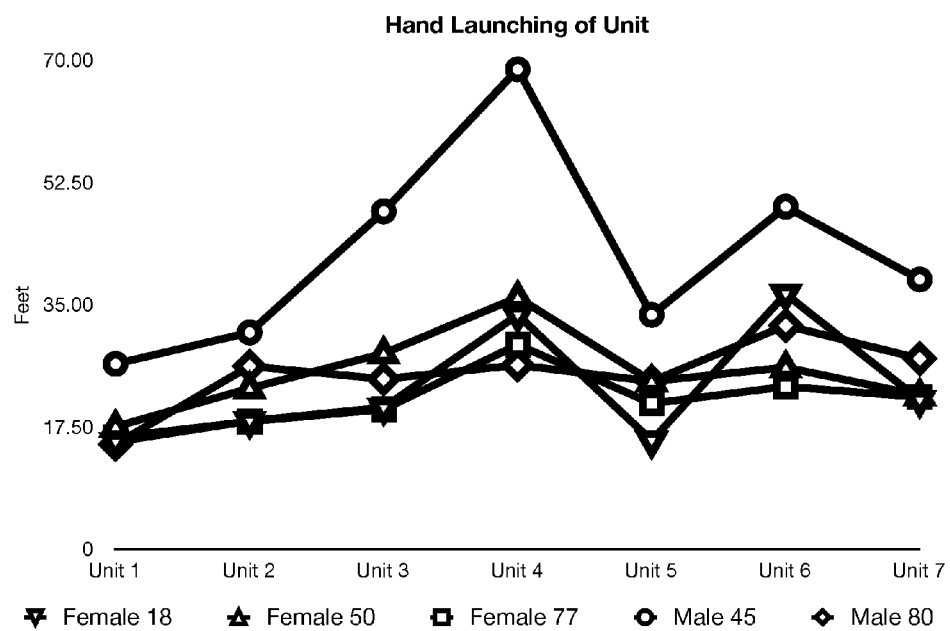

FIG. 1 is a perspective view of the vessel.
FIG. 2 is a side view of the vessel.
FIG. 3 is a front view of the vessel with cap attached.
FIG. 4 is a cross section view of the vessel.
FIG. 5 is a view of a cap of the vessel.
FIG. 6 is a side view of the vessel showing launching rings.
FIG. 7 is a graph/table with hand launch data.

DRAWINGS

Reference Numerals

10 shell
20 grip
30 cap
40 neck
50 cavity
60 launching ring

DETAILED DESCRIPTION

FIGS. 1-7

The first embodiment of the vessel is illustrated in FIGS. 1-6. Vessel has a shell 10 in a cylindrical shape with rounded ends (prolate spheroid), comprised of PVA plastic or other biodegradable material which will dissolve in water with no adverse effects on plant or animal life. In this embodiment the shell 10 is made of PVA plastic, a dissolvable plastic or plant-based material.

On two sides of the shell 10 are grips 20, which are indentations incorporated into the shell 10. At one end of the shell 10 is a neck 40, which comprises the opening to a cavity 50. The cavity 50 is sealed using a cap 30 affixed to the neck 40. The cap 30 is affixed using screw threads on the cap 30 and the neck 40. Circling the shell, at the two points where the sides begin to taper toward the ends, are launching rings 60, which create an air barrier, necessary for launching vessel from an air cannon.

Test data from the hand launching of vessel by a variety of subjects is detailed in graph and table form in FIG. 7. The optimum measurements of vessel have been determined through testing of its launchability via both human hand and air cannon methods. The prolate spheroid shape that allows for best launchability through these methods has an approximate ratio of length to diameter between 2.0" and 2.5", with a margin of error of 0.1". To fit inside a standard size air cannon, the vessel may be no more than 3.25" in diameter. In testing, using a high-power standard size air cannon, the vessel was launched a distance of more than 200 feet. Using a low-power standard size air cannon, the vessel is expected to be launched a distance of less than 100 feet.

Alternative Embodiments

In one alternative embodiment, the shell 10 is a prolate spheroid with pointed ends (football shape) measuring approximately 9.25" length and 4.58" diameter, with the cap 30 attached. The sides of the shell 10 do not include grips 20 or launching rings 60. The cap 30 is affixed to the neck 40 using screw threads inside the cap 30 which match to screw threads on the outside of the neck 40. Since this embodiment has a larger diameter, it may be launched via a custom size air cannon.

In other embodiments the shell 10 may be a cylindrical or other aerodynamic shape with one or two rounded ends, or ends may be of an entirely different shape. The shell 10 may be made of any other biodegradable material that will conform to the shape and dissolve in fresh or salt water. The sides of the shell 10 may or may not include grips 20. The cap 30 may be affixed to the neck 40 using glue, or a pin made of the same dissolvable material or other means that will allow it to be securely affixed. The cap 30 may be rounded or flat. The sides of the shell 10 may or may not include launching rings 60.

Operation

In all embodiments the manner of using the launchable biodegradable vessel is as follows. Cremated remains or other dry materials are placed inside the container, which is then sealed. The vessel is then launched into a body of water, where it will break down over a period of time, dispersing the cremated remains or dry material as it does. The vessel may be launched by hand, by a catapult, or by an air cannon.

To fill the shell 10 with cremated remains or other dry material, the cap 30 is removed to expose the neck 40. Material is inserted into the cavity 50 through the neck 40 using a standard funnel or other such device. The cap 30 is then securely affixed to the neck 40. Grips 20 may be used to securely hold vessel for manual launch, or vessel (with or without grips 20) may be placed inside a launch device for delivery over a greater distance.

The vessel may or may not include a hole or holes, which will allow for quicker dispersion of the cremated remains or other dry material once the vessel is in the water. Content or commemorative information may be printed on the outside of the vessel using biodegradable ink or affixed in the form of a dissolvable label.

Advantages

From the description above, a number of advantages of some embodiments of the launchable biodegradable vessel become evident:

(a) Use of the vessel overcomes significant issues present in other delivery methods for cremated remains or other dry materials. It provides a safer and cleaner method for handling of those materials, without exposure to the skin and eyes. It prevents material from blowing back onto the user and ensures the material is dispersed into the body of water, rather than onto the shore or the deck of a boat.

(b) The size and shape of the vessel allow for easier handling and delivery over a greater distance. This allows the user to stand away from the slippery edge of a natural or man-made body of water. The vessel will also avoid striking a lower deck of a ship when released from a higher deck.

(c) The size and shape of the vessel allow for delivery via a launching device, such as a catapult or air cannon, which increases the delivery distance.

(d) In addition to safety and cleanliness, in the case of delivery of cremated remains into a body of water, the use of this vessel adds an emotional benefit. During this already difficult time, loved ones do not have to worry about cremated remains blowing back on them or onto the boat.

(e) As this vessel allows for delivery over a greater distance, loved ones also have more options for how and where it can be used.

(f) As the vessel is launched, either by hand or by use of a launching device, it is delivered a distance away from a ship, platform, dock, shore or other location, rather than having to be dropped straight down into the water.

(g) This vessel offers a lower-cost alternative to more decorative products on the market, and more ease of use than the lowest-cost alternatives.

Conclusion

Safety, cleanliness, easier handling and delivery over greater distance by hand or through the use of an air cannon or other launch device make the vessel beneficial for delivery of cremated remains or other dry materials into a body of water. Although the vessel has been described with reference to several embodiments, workers skilled in the art will recognize that changes may be made in form and detail without departing from the spirit and scope of the invention.

What is claimed is:

1. A vessel used for launch of cremated remains or other dry materials into a body of water by air cannon, comprising:
   a prolate spheroid container having a hollow interior and an opening at one end whereby the cremated remains or other dry materials may be placed inside;
   a cap affixed securely to the opening to seal in the cremated remains or other dry materials;
   the container and the cap are created from polyvinyl alcohol whereby the container and the cap dissolve in water; and
   wherein the container includes spaced launching rings encircling an exterior thereof which create an air barrier for launch of the vessel from the air cannon.

\* \* \* \* \*